Figure 1:
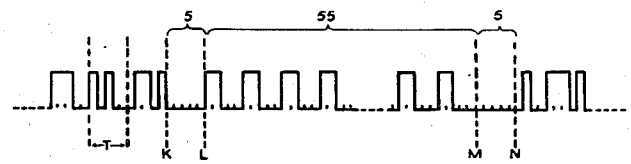

March 26, 1957 R. S. ARBON ET AL 2,786,892
PULSE SIGNALLING SYSTEMS
Filed Feb. 23, 1952 6 Sheets-Sheet 1

INVENTORS
ROBERT STANLEY ARBON
DAVID WILLIAM ELSON
GEORGE JAMES HUNT

BY
ATTORNEY

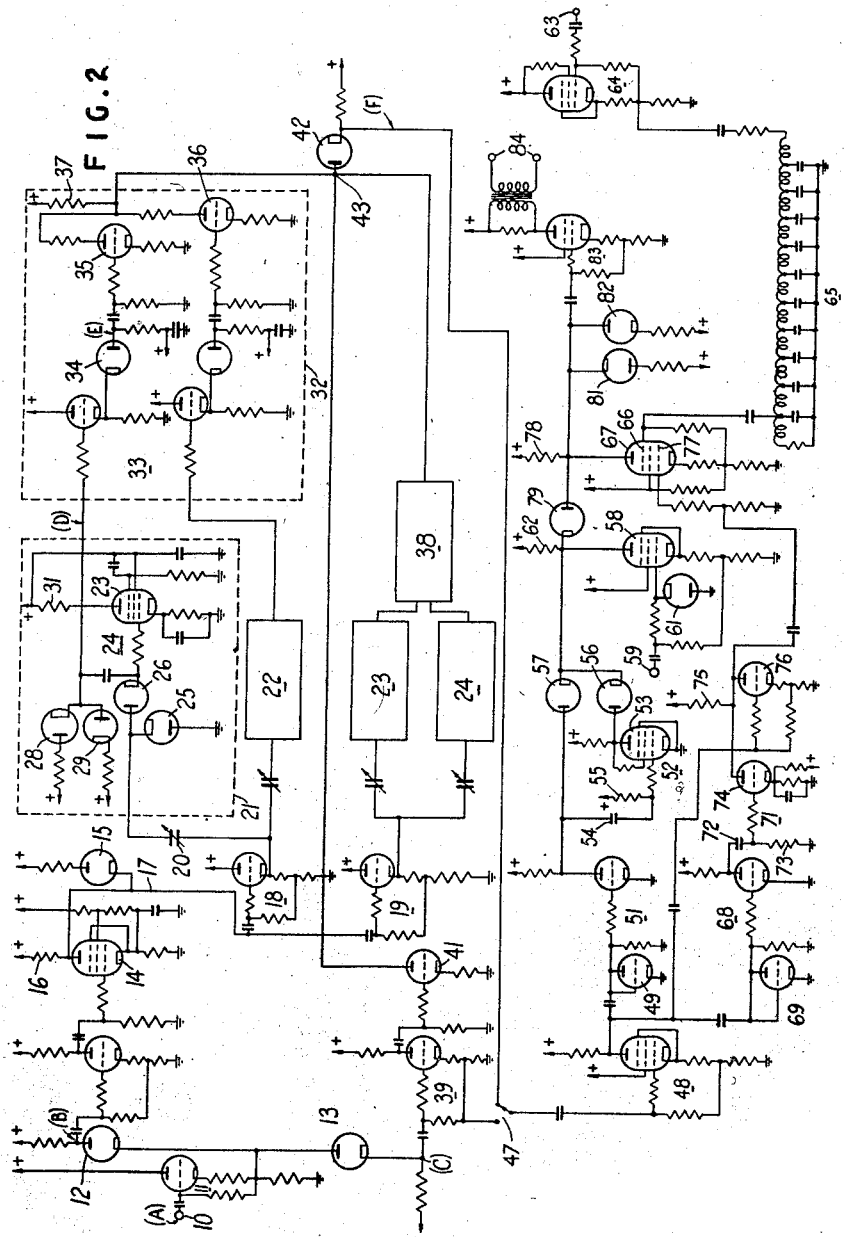

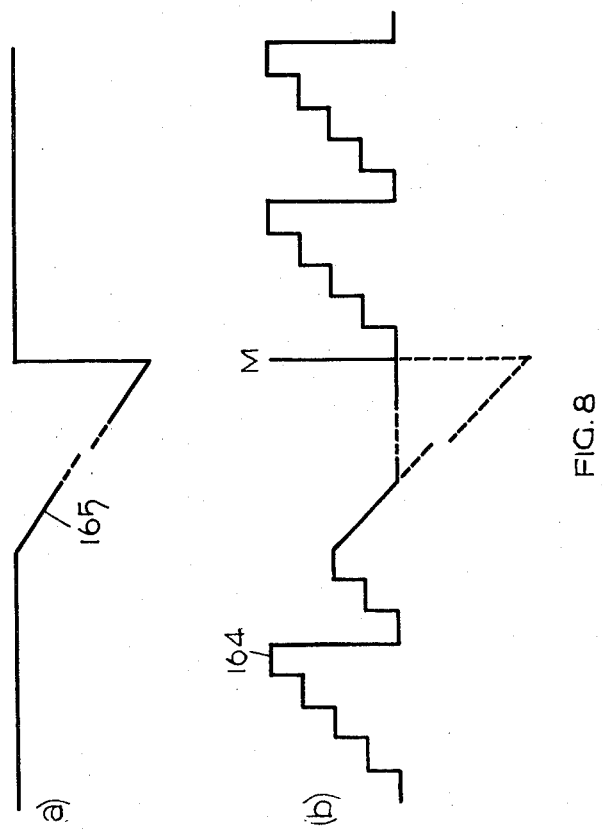

United States Patent Office 2,786,892
Patented Mar. 26, 1957

2,786,892

PULSE SIGNALLING SYSTEMS

Robert Stanley Arbon, North Wembley, David William Elson, Buckhurst Hill, and George James Hunt, London, England, assignors to The General Electric Company Limited, London, England Application February 23, 1952, Serial No. 273,072

Claims priority, application Great Britain February 27, 1951

2 Claims. (Cl. 179—15)

This invention relates to pulse signalling systems and more particularly to systems of the kind using pulse code modulation.

In a pulse code modulation signalling system, the transmitted signal is made up, at each of a succession of pulse time-positions, of one of a small number of different pulse elements. The most usual form of such a signal at the present time contains only two different pulse elements and these may be a pulse and no pulse or alternatively positive and negative pulses.

If the system is a multichannel one, the signal level on each channel may be sampled in turn and each sample represented by pulse elements in a small number of adjacent pulse time-positions. Thus, if there are twelve channels, say, and each sample has five pulse time-positions, say, in the transmitted signal associated with that sample, a group of one sample of each channel may be represented by pulse elements in a group of sixty successive pulse time-positions in the transmitted signal. At the receiving terminal of the system, the samples are synthesised to the accuracy of the coding and are distributed to the several channels. It will be appreciated that it is essential for the decoding apparatus to have supplied to it the pulse elements in the relevant pulse time-positions in the transmitted signal when synthesising a sample of any particular channel and accordingly it is essential for the decoding apparatus to operate so that it is in the correct phase or time register with the received pulse code signal. Moreover, it is not possible to identify any particular time-position in the so-called group and successive groups follow one another without any separation or distinguishing feature between them.

It is therefore necessary that some synchronising signal shall be transmitted but it is desirable that this shall consist only of the same pulse elements as comprise the intelligence to be transmitted.

One object of the present invention is to provide a system in which such a synchronising signal is transmitted.

According to one aspect of the present invention, in a pulse code modulation signalling system there is arranged periodically to be transmitted, in place of the pulse elements carrying the intelligence which is to be signalled, a synchronising signal which consists of the same pulse elements as the remainder of the transmitted signal and which has a characteristic pulse pattern, there being synchronising means at the receiving terminal of the system which means is selectively responsive to the said characteristic pulse pattern in the pulse signal received by that terminal.

Thus, if the transmitted signal contains only two different pulse elements, the synchronising signal may consist of one of those elements at each of a small number of adjacent pulse time positions and the other element at each of a small number of adjacent pulse time-positions alternately throughout the pattern. For example if the two pulse elements are "pulse" and "no pulse," successive pulse time-positions may have these elements so that the pattern is two pulses, three blanks, two pulses, three blanks and so on.

Preferably synchronising is effected at the instant the pattern ceases. In order to prevent false operation of the synchronising means, it is desirable that the pulse elements carrying the intelligence which is to be signalled are suppressed or blanked out at a plurality of pulse time-positions both before and after a synchronising signal.

According to another aspect of the present invention, in apparatus for generating a pulse code modulation signal which carries intelligence supplied to the apparatus, there is provided means periodically to insert a synchronising signal in the output signal in place of the pulse elements carrying the required intelligence, this synchronising signal consisting of the same pulse elements as the remainder of the generated signal and having a characteristic pulse pattern.

According to yet another aspect of the present invention, in apparatus for receiving a pulse code modulation signal, there is provided synchronising means selectively responsive to a synchronising signal which is contained in the received signal and which has a characteristic pattern formed by the same pulse elements as the remainder of the received signal.

Figure 4:
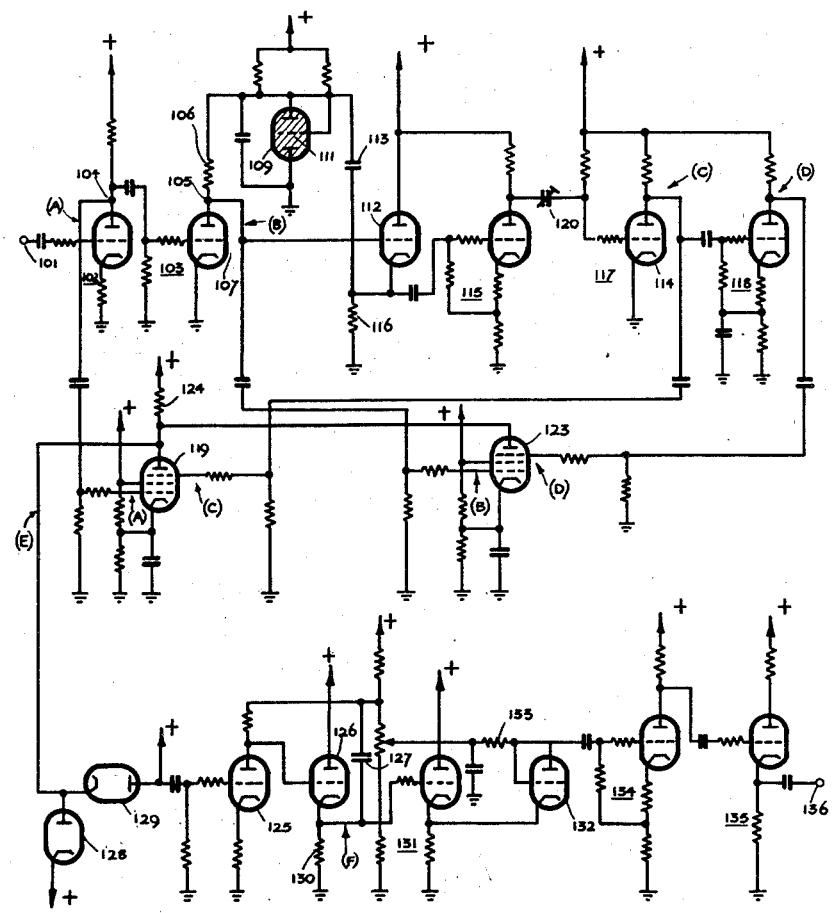
Figure 3:
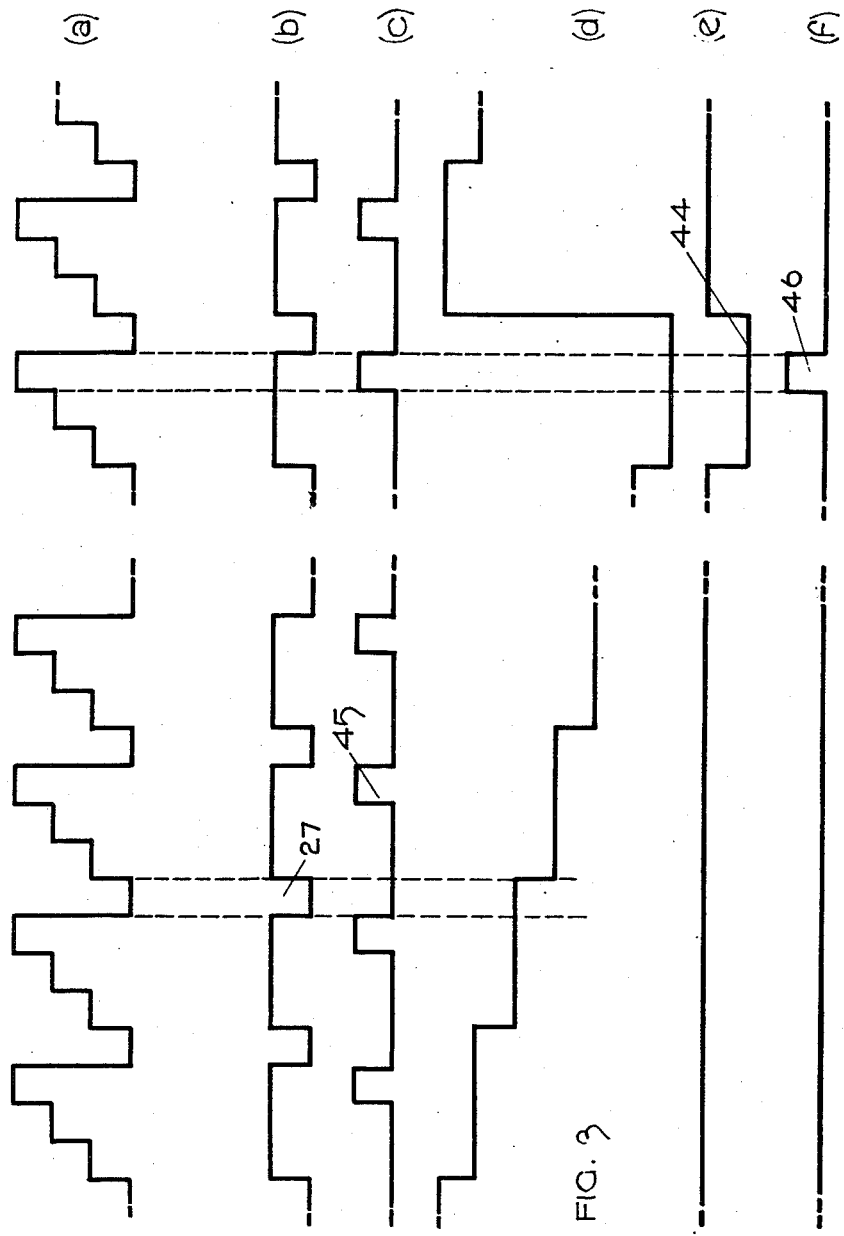
Figure 5:
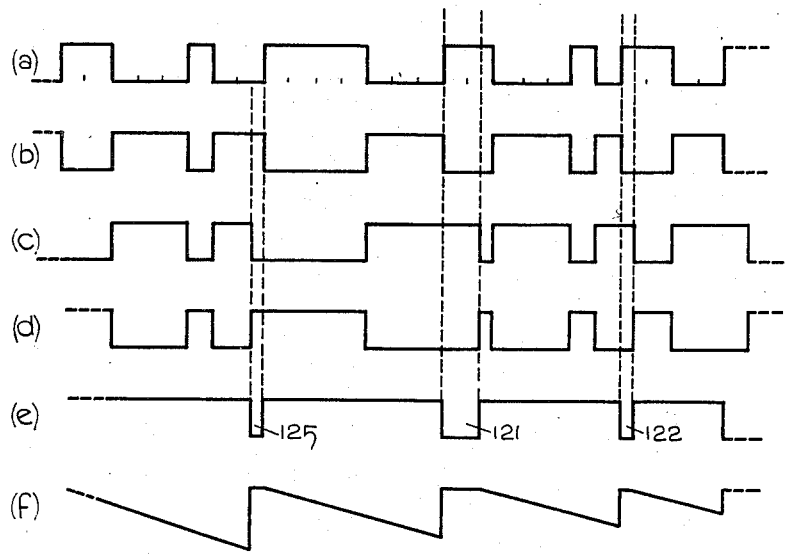
Figure 6:
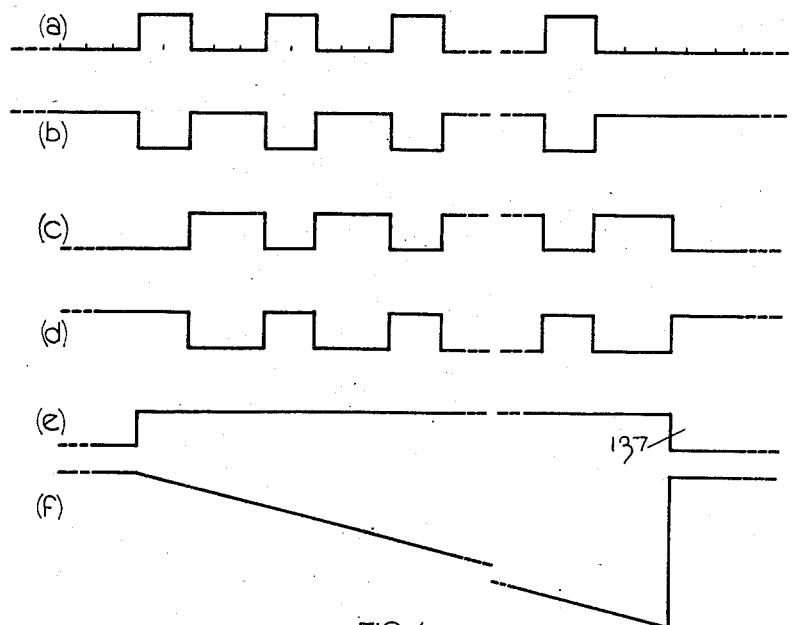
Figure 7:
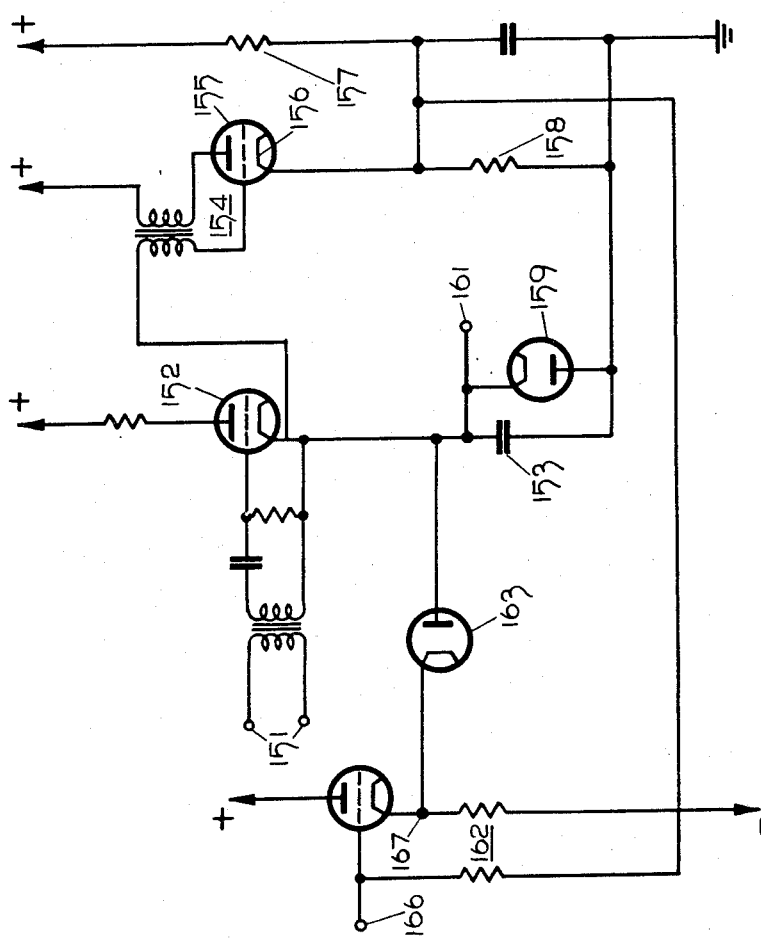

One arrangement of synchronising apparatus in a 12-channel pulse code modulation signalling system in accordance with the present invention will now be described by way of example with reference to Figures 1 to 8 of the accompanying drawings in which:

Figure 1 shows the waveform of a portion of the transmitted signal,

Figure 2 shows the circuit of that part of the apparatus for generating the transmitted signal which inserts the synchronising signal, Figures 3(a), (b), (c), (d), (e) and (f) show the waveforms of signals produced at the points marked (A), (B), (C) . . . etc. respectively in Figure 2, Figure 4 shows the circuit of that part of the receiving apparatus for separating the synchronising signal, Figures 5(a), (b), (c), (d), (e) and (f), show the waveforms of signals produced at the points marked (A), (B), (C) . . . etc. respectively in Figure 4 when a typical pulse code signal, that is to say not a synchronising signal, is received, Figures 6(a), (b), (c), (d), (e) and (f) show the waveforms of signals produced at the same points on the circuit of Figure 4 as those shown in Figure 5 when a synchronising signal is received, Figure 7 shows the circuit of another part of the receiving apparatus, and Figures 8(a) and (b) show the waveforms of the signal supplied to the circuit of Figure 7 for synchronising and the output of that circuit respectively.

In the first system, each of the twelve channels is sampled in turn and the amplitude of each sample is represented in known manner by either a pulse or no pulse at five pulse time-positions in the transmitted signal. Thus, in Figure 1, there are transmitted during the interval T, for example, two pulses at five pulse time-positions which approximately define one sample of one channel. Over a period of 12T all the channels are sampled once so that a group of channel samples are represented by a pulse or no pulse at each of sixty time-positions and the process is repeated continuously. The pulse at a time-position is of such duration that if pulses occur at adjacent time-positions there is effectively produced in the transmitted signal a single pulse of increased duration. The pulse time-positions occur in the transmitted signal at a frequency of 420,000 per second so that each of the twelve channels is sampled 7,000 times per second, For the purpose of synchronising the receiving apparatus, there is arranged to be transmitted, as hereinafter described, a synchronising signal once every 1.44 seconds. Thus, referring again to Figure 1, the pulses carrying the intelligence to be signalled are suppressed between the instances K and N, that is to say over a period corresponding to approximately sixty-five pulse time-positions and the synchronising signal is inserted between the instances L and M which correspond to fifty-five pulse time-positions, the intervals K to L and M to N each corresponding to approximately five such positions. The synchronising signal itself consists of two adjacent pulse time-positions having pulses followed by three positions without pulses, repeated eleven times. It will be appreciated that the pulses in the synchronising signal are identical in form with those which make up the remainder of the transmitted signal and may only be identified by their characteristic pattern.

One of the so-called "channels" carries the intelligence on twenty sub-channels so that each of the pulse time-positions in four successive groups allocated to that "channel" correspond to one of the sub-channels. In order to combine the intelligence on the appropriate five sub-channels in the coding of each group of samples, a generator is provided which supplies a signal having a stepped waveform. At each step the amplitude level of the signal is changed by substantially the same amount so that the resulting waveform looks like a "staircase" and hereinafter in this specification the terms "staircase generator" and "staircase signal" will be used in respect of such generators and signals having such waveforms. In the present case, a four-level staircase signal is utilised, each level lasting for one coding group and being used to select the appropriate five sub-channels to be included in that group. Thus this staircase signal, which is shown in Figure 3(a), has a repetition frequency of 1,750 per second.

Referring now to Figure 2, the above-mentioned staircase signal is applied to a terminal 10 and is then passed through a cathode-follower stage 11 to diode valves 12 and 13 which are arranged to pass the bottom and top levels of the staircase signal so as to produce signals having the waveforms shown in Figures 3(b) and 3(c) respectively. The pulse signal passed by the valve 12 during the period of each such bottom level is reversed in phase and is fed to an amplifier valve 14 which is biassed so as to be cut off in the absence of a pulse.

The voltage to which the anode of the valve 14 may drop when a pulse 27, after phase reversal, is applied to that valve through the diode 12 is limited by the diode valve 15. When there is no pulse 27, the anode voltage equals the terminal voltage of the supply connected through the resistor 16 and the amplitude of the pulses supplied over the path 17 is therefore dependent upon that supply voltage. It will be appreciated that these pulses 27 last for the duration of one group of samples in the transmitted signal and recur once every four groups. The pulses 27 are supplied through cathode-follower stages 18 and 19 to four staircase generators 21 to 24.

Considering now the generator 21, the pulses supplied through a condenser 20 are applied to the control grid of a pentode valve 23 which is arranged in a Miller integrator circuit 24. The anode voltage of the valve 23 is therefore stepped as shown in Figure 3(d) and, owing to the operation of the diode valves 25 and 26, each decrease in voltage level is produced by the trailing edge of an input pulse 27. The maximum and minimum anode voltages are limited by the diode valves 28 and 29. The anode of the valve 23 is connected through a resistor 31 to the same supply as is connected through the resistor 16 to the valve 14 and the arrangement is such that variations in the supply voltage simultaneously vary the amplitude of the pulses 27 and the amplitude of the staircase signal having the waveform of Figure 3(d) so that the number of levels in the staircase is substantially independent of this supply voltage over a range of values.

The number of levels in this staircase is determined, inter alia, by the capacity of the condenser 22 and the staircase generator 21 is arranged to produce a signal having nine levels. The generators 22, 23 and 24 are similar to the generator 21 but are arranged to produce signals having eight, seven and five levels respectively.

The staircase signals supplied by the generators 21 and 22 are fed to a unit 32 and, considering again the signal having the waveform of Figure 3(d), this is passed through a cathode follower stage 33 and the bottom level of the signal is selected by the diode valve 34 to produce a signal having the waveform of Figure 3(e). This signal is passed through an amplifier valve 35. The staircase signal as supplied by the generator 22 is similarly treated and the amplifier valves 35 and 36 have a common load resistor 37.

The staircase signals supplied by the generators 23 and 24 are fed to a unit 38 which is similar to the unit 32.

The signal having the waveform shown in Figure 3(c), which is passed by the diode 13, is passed through an amplifier 39 which is resistance-capacity coupled to an amplifier valve 41. It will be appreciated that the resistor 37 in the unit 32 and the corresponding resistor (not shown) in the unit 38 are connected in parallel. These two resistors also form the anode load of the valve 41 and a diode valve 42 is arranged to conduct when the voltage at the point 43 exceeds a predetermined value.

Thus each pulse 44 (Figure 3(e)) derived from the staircase generator 21 appears after amplification and phase reversal at the point 43 as do similar pulses derived from the staircase generators 22, 23 and 24. Since the staircase generators 21 to 24 have different numbers of levels, the pulses in the trains of pulses (having waveforms similar to that of Figure 3(e)) have different recurrence frequencies and, when two or more of these pulses occur simultaneously, there is a corresponding increase in the voltage at the point 43. The voltage at the point 43 is also increased when a pulse 45 occurs in the waveform of Figure 3(c) and the diode 42 is arranged to conduct only when pulses, such as the pulse 44, in all four trains of pulses and a pulse 45 occur simultaneously so as to produce a signal having the waveform of Figure 3(f). The pulses 46 (only one of which is shown) recur in this latter signal at a frequency of $$\frac{1750}{9 \times 8 \times 7 \times 5}$$

per second, that is to say one every 1.44 seconds, and each have a duration of one group of samples, that is to say equal to sixty pulse time-positions in the transmitted pulse code signal. Each pulse 46 is thus shorter than the period during which the normal pulse code signal is to be blanked out when a synchronising signal is to be transmitted but longer than the period of the synchronising signal itself.

The necessary signals for blanking out the normal pulse code signal and for inserting the synchronising signal are derived from the pulses 46 (Figure 3(f)). Thus the signal having the waveform of Figure 3(f) is fed through a change-over switch 47 to an amplifier 48 and then, for the purpose of deriving the blanking signal, has its direct current component restored by means of the valve 49 and is then passed to an amplifier 51. The signal passed by the amplifier 51, and which has substantially the waveform of Figure 3(f), is supplied to a pulse producing circuit 52. This circuit 52 includes a pentode valve 53 and a differentiating circuit formed by a condenser 54 and a resistor 55 so that there is a momentary increase in the anode current of the valve 53 as soon as a pulse is applied to the circuit and a decrease when that pulse ceases. The positive-going pulse in the anode voltage of the valve 53 is selected by a diode valve 56 and is added to the positive-going pulse of the signal supplied by the amplifier 51 which is passed by a diode valve 57, the combined signal being applied to the anode of a pentode valve 58.

The positive-going code signal supplied by the coding apparatus (not shown) is applied to a terminal 59 and, after having its direct current component restored by a diode valve 61, is amplified by the valve 58. The pulse code signal, the pulses being negative-going, is developed across the anode load resistor 62 and is fed through a diode valve 69 to an amplifier stage 83. The code pulses are however suppressed between the instances K and N, in the signal shown in Figure 1, the period K to M being blanked out by the signal passed by the diode 57 while the period M to N is blanked out by the signal passed by the diode 56 as a result of the bias produced by these signals on the diode 79.

In the coding apparatus there is a five-level staircase generator, each level corresponding to one pulse time-position in the transmitted pulse code signal, that is to say each cycle of the staircase signal produced thereby lasts for the five adjacent pulse time-positions defining one sample. This staircase signal is utilised to generate the transmitted synchronising signal in which pulses occur during the duration of the bottom two levels of the staircase signal, that is to say there is alternately a pulse occupying two adjacent time-positions and no pulse in three adjacent time-positions.

This "two pulse/three no pulse" signal is applied to a terminal 63 and, after passing through a cathode follower stage 64, is supplied to a delay line 65 so that the pulses of the synchronising signal fall exactly at the correct time-positions in the transmitted signal. The signal supplied by the delay line 65 is fed to the suppressor grid 66 of a pentode valve 67. If the signal fed to the terminal 63 is of the correct phase, the delay line 65 may be omitted.

The signal for controlling the duration of the inserted synchronising signal is obtained from the output of the amplifier 48 through a further amplifier 68 after having its direct current component restored by a valve 69. The output from the amplifier 68 consists of positive-going pulses and these are passed to a pulse producing circuit 71. Thus the output is differentiated by means of the condenser 72 and resistor 73 and fed to a valve 74 which is biassed so as only to conduct during a positive pulse in the differentiated signal, that is to say momentarily upon the commencement of a pulse supplied by the amplifier 48. The valve 74 has a common anode load resistor 75 with a further valve 76 to which is supplied the output signal from the amplifier 48. The voltage developed across the resistor 75 is fed to the control grid 77 of the valve 67, the arrangement being such that the valve 67 is conducting when a pulse is supplied to the valve 76, since this produces a positive-going pulse across the resistor 75, but is cut off when the valve 74 is conducting. Referring again to Figure 1, the valve 67 is thus conducting between the instances L and M, the valve 74 being conducting between K and L so as to suppress that part of the pulse supplied by the amplifier 48.

The synchronising signal of required duration is thereby developed across the anode resistor 78 and is added to the pulse code signal which is developed across the resistor 62 and is passed through the diode valve 79.

It will be appreciated that the transmitted signal is required to have only two levels and, in order to remove any difference between the levels of the components supplied by the valves 58 and 67, the combined signal developed across the resistor 78 is clipped by means of the two diode valves 81 and 82 before being fed to the amplifier 83, the signal to be transmitted being taken from the terminal 84.

With the arrangement operating as described above, the synchronising signal is transmitted once every 1.44 seconds. For the purpose of setting up the receiving apparatus, a more frequent synchronising signal may be desirable. Thus by operating the change-over switch 47 to its other position, synchronising signals may be transmitted at a frequency of 1,750 per second.

At the receiving terminal of the system, it is essential for the decoding apparatus to operate so that it is in the correct phase or time register with the received pulse code signal which may have been transmitted over a radio link. Operation of the decoding apparatus is controlled by a five-level staircase signal, each level corresponding to one pulse time-position in the received signal, and each cycle of this signal thus lasting for five such time-positions and being utilised to control the decoding apparatus during the synthesis of one sample. The timing of the staircase generator which supplies this staircase signal is determined by the transmitted synchronising signal.

At the receiving terminal it is first necessary to "recognise" the transmitted synchronising signal. Referring now to Figure 4, a negative-going pulse signal derived from the received signal, if necessary after pulse re-shaping to remove unwanted "noise" and substantially to produce a signal having a waveform which is the inverse of that of Figure 1, is supplied to a terminal 101. This signal is passed through two amplifier stages 102 and 103 which also tend to limit the levels of the resulting pulse code signal. At the points 104 and 105 there are therefore produced positive-going and negative-going pulse signals respectively.

A resistor 106 forms the anode load of the triode valve 107 in the stage 103 and is connected between the anode of that valve and a supply line 108 which is voltage stabilised by means of a neon tube 109 which has an auxiliary striking electrode 111. The anode of the valve 107 is connected directly to the control grid of a triode valve 112, which is arranged as a cathode-follower stage, while a condenser 113 is connected between the stabilised supply 108 and the cathode of the valve 112. In the absence of a received pulse the valve 107 is non-conducting and thus its anode voltage and the cathode voltage of the valve 112 substantially equal the stabilised voltage of the supply 108 so that the condenser 113 is discharged. As soon however as a pulse is received, the valve 112 is cut off by the fall in anode voltage of the valve 107 and the condenser 113 commences to charge. The condenser 113 is instantly discharged when the valve 112 conducts again, that is to say at the end of a received pulse or train of consecutive pulses. The amplitude of the voltage developed across the condenser 113 at the instant of discharge is proportional to the number of consecutive received pulses and is arranged to have a maximum value substantially equal to that produced by three such pulses. This voltage is fed through an amplifier stage 115 to a valve 114 in a pulse producing circuit 117 which is arranged to produce a pulse on the trailing edge, that is to say when the condenser 113 is discharged, of each substantially triangular portion of the signal developed across the cathode resistor 116. These produced pulses have a duration proportional to the peak amplitude of the triangular portions of the waveform of the applied signal and are arranged to last half as long again as the received pulse or train of pulses in adjacent time-positions, up to the maximum of three such pulses. Thus the produced pulse created by a train of two received pulses lasts over the subsequent three pulse time-positions in the received signal, while a received train of three or more pulses gives rise to a produced pulse lasting over the interval of 4.5 pulse time-positions.

The produced pulses are fed through an amplifier stage 118 in which there is phase inversion. Referring now to Figure 5, the waveforms (a) and (b) are of a typical portion of positive-going and negative-going pulse signals developed at the points 104 and 105 in Figure 4, there being a random distribution of pulses. The waveforms of the signals supplied by the pulse-producing circuit 117 and the amplifier stage 118 respectively are shown at Figures 5(c) and 5(d).

The positive-going pulse signal produced by the amplifier 102 and the signal supplied by the pulse producing circuit 117 are fed to the control grid and suppressor grids respectively of a pentode valve 119. This valve 119 is non-conducting until positive-going pulses occur simultaneously in the applied signals. Thus referring now to Figure 5(e) which shows the waveform of the anode voltage of the valve 119, there are produced pulses 121 and 122, hereinafter called "spoiling pulses," due to the fact that both the waveforms of Figures 5(a) and 5(c) are then positive-going. Similarly signals having the waveform of Figures 5(b) and 5(c) are supplied to the control grid and suppressor grid respectively of a pentode valve 123 which has a common load resistor 124 with the pentode 119. The valve 123 is arranged similarly to the valve 119 and due to the valve 123 being conducting there is produced a spoiling pulse 125.

Referring now to Figure 6, the waveforms at (a), (b), (c) and (d) correspond to those of Figures 5(a), (b), (c) and (d) and are of the signals produced when a synchronising signal is received. It will be seen that since the waveforms (a) and (c) and also the waveforms (b) and (d) are complementary, both the valves 119 and 123 are cut off and no spoiling pulses are produced. The duration of the pulses produced by the circuit 117 may be varied by adjusting the capacity of the condenser 120 and, when setting up the apparatus it is adjusted so that a synchronising signal produces no spoiling pulses.

It will be appreciated that, during the transmission of a normal pulse code signal, the "two pulse/three no pulse" pattern similar to the synchronising signal may occur over a group of pulse time-positions. It is obviously undesirable for such a random occurrence to effect synchronisation and accordingly the absence of spoiling pulses over a relatively large number of time-positions is utilised to detect the true synchronising signal and reduce the probability of false operation. Thus triode valves 125 and 126 are arranged in a similar manner to the valves 107 and 112 and so that a condenser 127 is slowly charged in the absence of negative-going spoiling pulses, the condenser 127 being instantly discharged upon the occurrence of a spoiling pulse. Due to the waveforms shown in Figure 6 not in practice being exactly rectangular the voltage developed across the resistor 124 may contain pulses of smaller amplitude than true spoiling pulses at each leading and trailing edge of say the pulses of the waveform of Figure 6(c). These smaller pulses are removed by means of the diode valves 128 and 129, the cathode of the diode 128 being biassed to a higher voltage than the anode of the diode 129. The waveforms of the voltages developed across the cathode resistor 128 during the reception of a normal pulse code signal and a synchronising signal are shown in Figure 5(f) and Figure 6(f) respectively.

The voltage developed across the resistor 130 is fed through a cathode-follower stage 131 to the cathode of a triode valve 132 which is connected as a diode, the anode and grid thereof being connected through a resistor 133 to a point maintained at a positive voltage. The arrangement is such that the valve 132 does not conduct until the condenser 127 has charged for a period of approximately forty pulse time-positions in the received pulse signal. The anode voltage of the valve 132 is fed through an amplifier stage 134 and a cathode-follower stage 135 to a terminal 136. The voltage on the terminal 136 thus rises until the spoiling pulse 137 (Figure 6(e)) is produced. There is thus produced a positive-going triangular pulse at the terminal 136 for approximately the last fifteen pulse time-positions of the synchonising signal and this pulse has a sharp trailing edge which is utilised to effect synchronisation of the local five-level staircase generator. It will be appreciated that this trailing edge occurs at the instant M shown in Figure 1.

The circuit of this five-level staircase is shown in Figure 7 and, referring now to that figure, an oscillation having a frequency of 420 kilocycles per second is supplied across a pair of terminals 151. It will be realised that this is the frequency of the pulse time-positions in the pulse code signal and the oscillation is derived from the received signal so as to have exactly the correct frequency. This oscillation is applied to a triode valve 152 which is caused thereby to be conducting during each positive half-cycle and to charge the condenser 153 in the cathode circuit.

A blocking oscillator 154 is provided comprising a triode valve 155 having its cathode 156 maintained at a positive voltage by virtue of the potentiometer formed by resistors 157 and 158. This oscillator 154 discharges the condenser 153 as soon as the voltage across that condenser tends to rise above the cathode voltage of the valve 155 and a diode valve 159 ensures that the voltage on the output terminal 161 does not then go negative with respect to earth.

The signal having the waveform of Figure 8(a) and consisting of a negative-going triangular pulse 165 lasting for the duration of approximately fifteen steps of the waveform of Figure 8(b) is applied to a terminal 166 and thus to the cathode-follower stage 162. This signal is obtained by phase inversion, for example in a conventional valve amplifier from the signal produced at the terminal 136 (Figure 4). The voltage at point 167 of a cathode-follower stage 162 is limited to that of the cathode 156 of the valve 155 and is normally higher than the maximum voltage 164 (Figure 8(b)) produced at the output terminal 161 so that a diode valve 163 is non-conducting.

Upon the occurrence of the pulse 165, the voltage of the point 167 drops and causes the diode 163 to conduct and thereby reduce the voltage on the terminal 161. Owing to the diode 159 however, the terminal voltage cannot fall below earth potential and is held at that value until the trailing edge of the pulse 165 occurs when the diode 163 ceases to conduct and the staircase generator operates normally again. This ensures that the first step of the next staircase cycle occurs within the period of one step of the staircase signal, the exact phasing depending on the phase of the oscillation applied to the terminals 151.

There may also be provided generators at the receiving terminal for producing twelve-level and four-level staircase signals for controlling the distribution of the received intelligence to the twelve channels and further to the twenty sub-channels. These staircase generators may be similar to the generator described above with reference to Figure 7 and may, in similar manner, be synchronised by the signal developed at the terminal 136 (Figure 4).

It will be appreciated that the present invention is not restricted to systems in which the synchronising signal has a "two pulse/three no pulse" pattern. For example another pattern consists of pulse and no pulse occurring alternately at pulse time-positions throughout the synchronising signal.

We claim:

1. A pulse code modulation signalling system comprising a transmitting station and a receiving station between which stations there is arranged to be transmitted a pulse signal which consists of only two different pulse elements at a succession of pulse time-positions, the transmitting station comprising coding apparatus which is arranged to supply a pulse code signal that constitutes the transmitted signal the major part of the time and consists of one or other of the two pulse elements at each of a succession of pulse time-positions that recur at a predetermined frequency, means to supply to the coding apparatus the information to be signalled over the system, means to generate a synchronizing pulse signal which consists of said pulse elements at each of a succession of pulse time-positions which recur at said predetermined frequency so that the pulse elements of this signal have a characteristic pattern, and means periodically to transmit the synchronizing pulse signal in place of the said pulse code signal supplied by the coding apparatus at a plurality of adjacent pulse time-positions in the transmitted signal, the pulse elements of the synchronizing signal as transmitted being identical with those of the rest of the transmitted signal, and the receiving station comprising decoding apparatus, means to supply the received pulse signal to the decoding apparatus, means which is responsive to the said characteristic pulse pattern in the received pulse signal and which determines the instant the characteristic pattern ceases, and means operable by the last-mentioned means to synchronize the decoding apparatus.

2. A pulse code modulation signalling system according to claim 1 wherein the transmitting station has means to blank out any pulse elements at a plurality of pulse time-positions of the transmitted signal both before and after the synchronizing pulse signal is transmitted.

References Cited in the file of this patent

UNITED STATES PATENTS

| | | |
|---|---|---|
| 2,515,613 | Schoenfeld | July 18, 1950 |
| 2,527,649 | Peterson | Oct. 31, 1950 |
| 2,549,422 | Carbrey | Apr. 17, 1951 |